United States Patent [19]
Roth et al.

[11] 4,081,079
[45] Mar. 28, 1978

[54] MANUALLY PROGRAMMABLE CARD SELECTOR APPARATUS

[76] Inventors: Leo Roth; Ursula Roth, both of 52-27 69th St., Maspeth, N.Y. 11378

[21] Appl. No.: 744,982

[22] Filed: Nov. 26, 1976

[51] Int. Cl.² .............................................. B07C 7/00
[52] U.S. Cl. ................................................ 209/110.5
[58] Field of Search ................... 209/110.5, 80.5, 110, 209/608, 612

[56] References Cited

U.S. PATENT DOCUMENTS

| | | | |
|---|---|---|---|
| 2,577,460 | 12/1951 | Gottschalk | 209/110.5 |
| 2,587,682 | 3/1952 | Bard | 209/110.5 |
| 2,683,458 | 7/1954 | Davis et al. | 209/110.5 |
| 3,354,885 | 11/1967 | Ludwig | 209/110 |
| 3,502,209 | 3/1970 | Shaw | 209/110.5 |
| 3,688,900 | 9/1972 | Wanous | 209/110.5 |

FOREIGN PATENT DOCUMENTS

| | | | |
|---|---|---|---|
| 1,143,182 | 2/1963 | Germany | 209/110.5 |
| 46,246 | 5/1966 | Germany | 209/110 |
| 1,289,341 | 2/1969 | Germany | 209/110.5 |
| 583,391 | 12/1946 | United Kingdom | 209/110.5 |

*Primary Examiner*—Robert B. Reeves
*Assistant Examiner*—Edward M. Wacyra

[57] ABSTRACT

A manually programmable card selector apparatus comprising a hollow rectangular container having a top section which has a card receiving opening and slidable rods disposed within grooves receiving apertured clips secured to the cards which extend beyond the opening to support the cards and retract to provide delivery of selected cards to an opening in an end wall by a discharge chute.

4 Claims, 5 Drawing Figures

MANUALLY PROGRAMMABLE CARD SELECTOR APPARATUS

BACKGROUND OF THE INVENTION

Manually operable apparatus for selecting cards carrying desired data out of a collection of cards carrying both desired and undesired data are well known to the art. For example, U.S. Pat. No. 3,789,982 discloses the use of movable and individually operable selector knives used in conjunction with notched sections of cards; U.S. Pat. No. 999,991 discloses insertable rods cooperating with cards having slots and perforations; U.S. Pat. No. 1,235,502 shows insertable parallel rods disposed at various vertical levels and horizontally spaced cooperating with cards having holes and slots; and U.S. Pat. No. 1,744,373 shows the use of laterally disposed key rods cooperating with cards having projecting tongues. In all of these known devices, the insertion of rods or other members into portions of cards is made for the purpose of removing the cards so selected. In contradistinction, in the present invention, certain cards are selected and removed from the collection of cards and for use by gravity action upon withdrawal of certain selected rods.

SUMMARY OF THE INVENTION

In accordance with the principles of this invention, there is provided a manually operable device for selectively extracting at least one data carrying card from a collection of rectangular data carrying cards having top horizontal edges.

The device employs a hollow container having first and second parallel vertical side walls disposed between first and second parallel vertical end walls, the end walls being perpendicular to the side walls, said container having a horizontal bottom section secured to the bottom of said side and end walls and a horizontal top section secured to the top of said side and end walls. The top section has an opening extending from the first end wall to a position intermediate the first and second end walls and further has a plurality of parallel grooves in the top surface which extend from said opening toward the second end wall. The second end wall has an opening which extends from said bottom section to a point intermediate the top and bottom of the second end wall.

The device further employs a like plurality of horizontal rods, each rod being slidably disposed in a corresponding one of said grooves, each rod being manually slidable between an extended position at which it spans the horizontal opening and a retracted position at which it is withdrawn from said horizontal opening. The device also employs a plurality of vertical clips, each clip being secured to the said card edge of a card with an aperture therein coplanar with said card and disposed above said card edge.

These cards are disposed within said top section opening in side by side position with said apertures being disposed along a like first plurality of horizontal lines, each line being aligned with a corresponding one of said grooves. Each rod, when in extended position, extends through all of the apertures in the corresponding line to support the cards having said apertures in raised position within the container. Each rod, when in retracted position, releases said support, whereby all unsupported cards falls to the bottom section and are manually removable from the container through the second end wall opening.

DETAILED DESCRIPTION OF PREFERRED EMBODIMENTS

Figure 1:
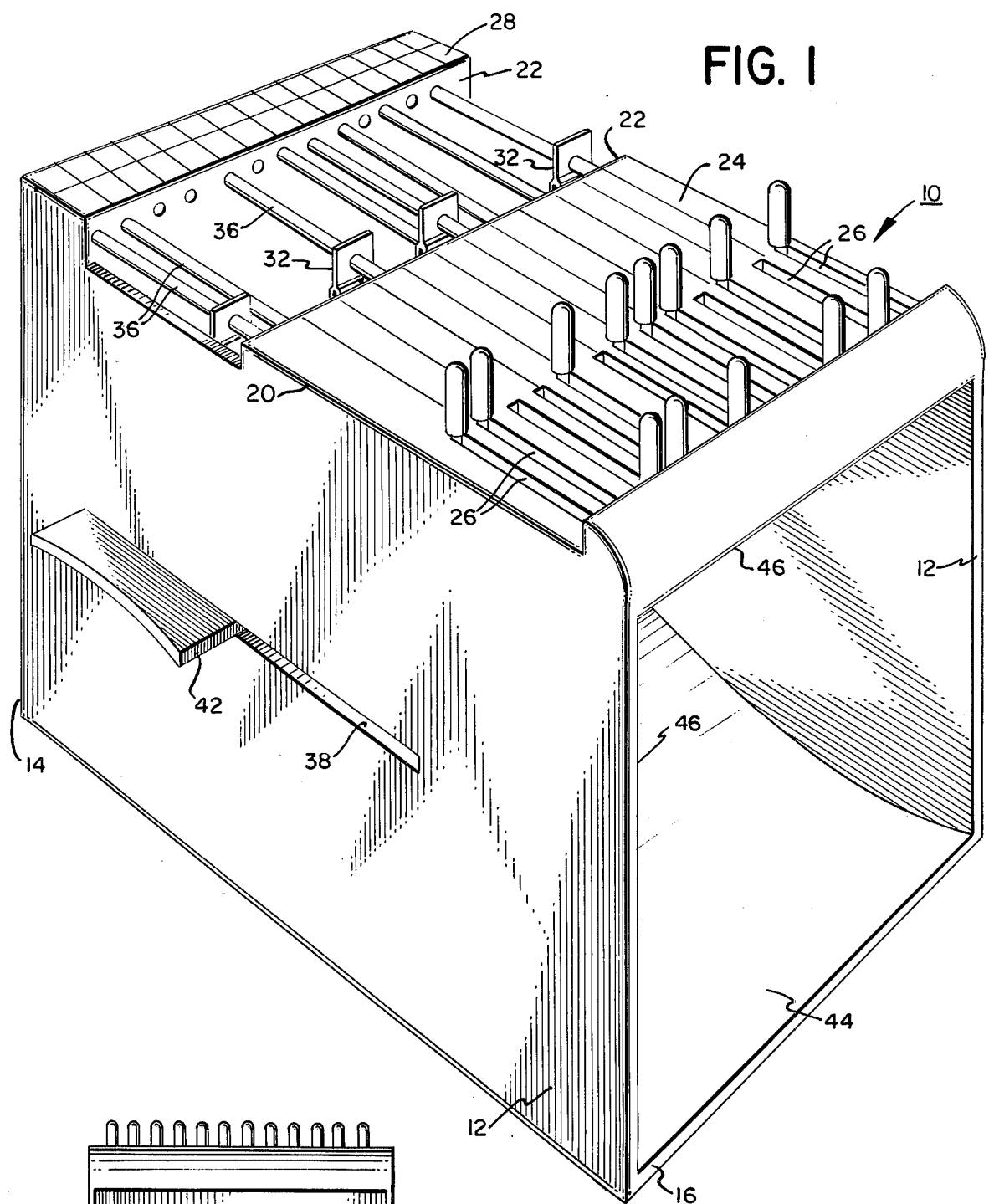
FIG. 1 is a perspective view of the invention.
Figure 2:
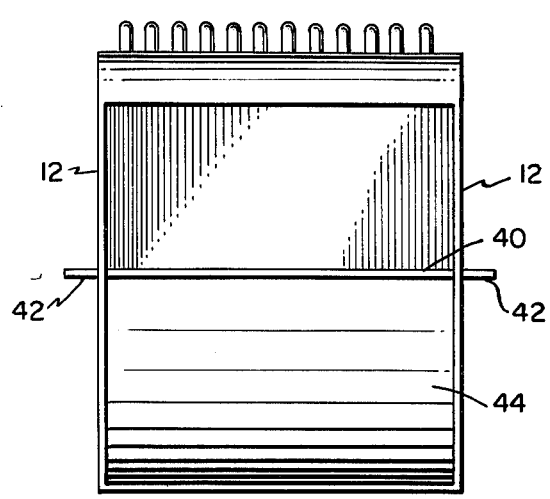
FIG. 2 is a front view thereof.
Figure 3:
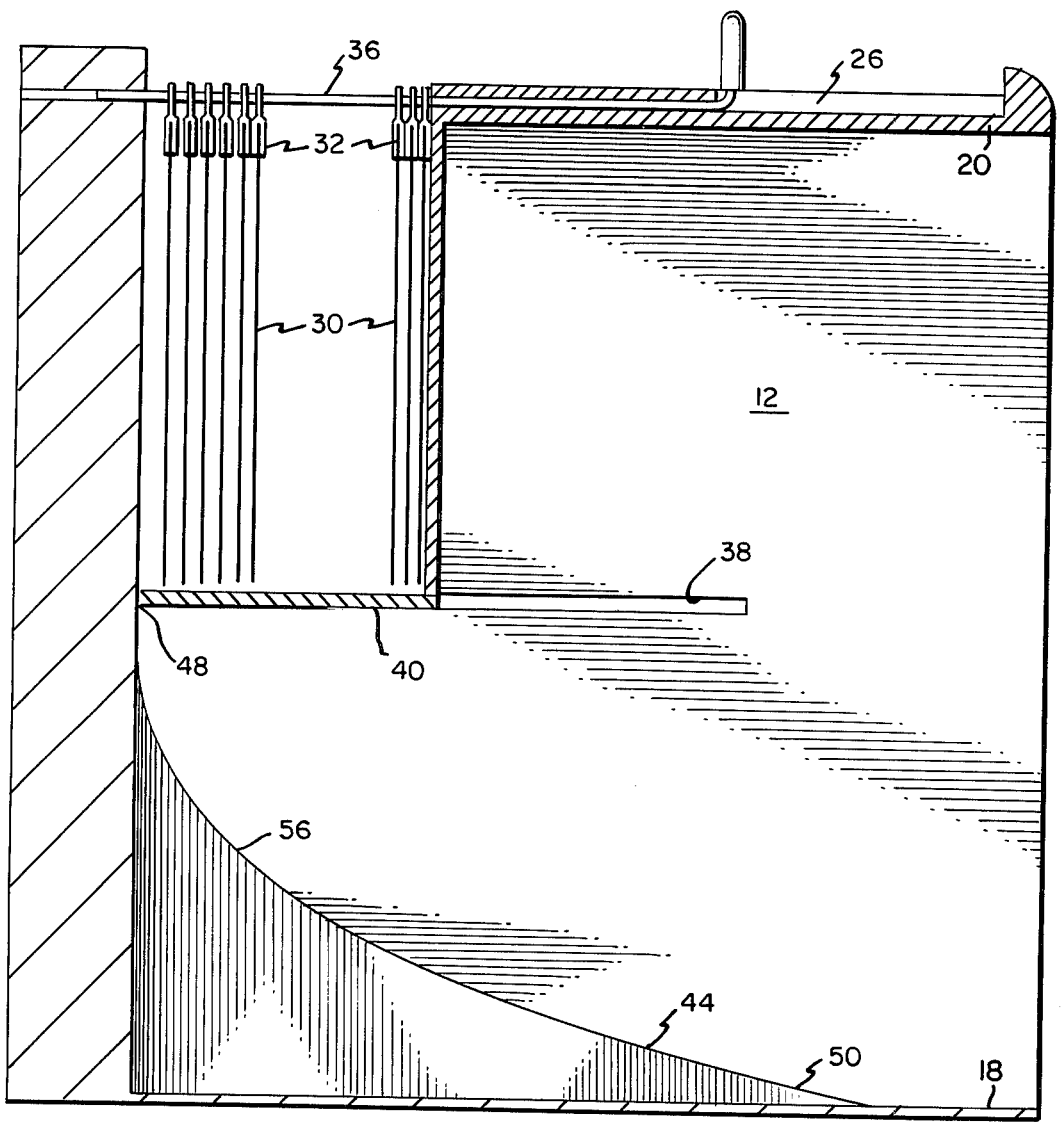
FIG. 3 is a side cross section view thereof.
Figure 4:
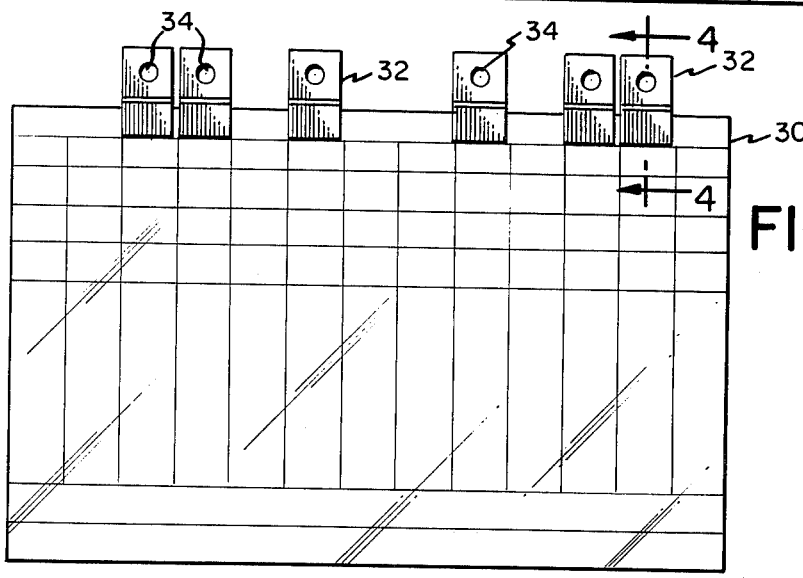
FIG. 4 is a detail front view of a card with removable clips as used in the invention.
Figure 5:
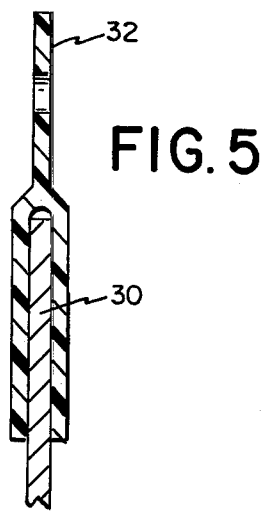
FIG. 5 is a view taken along line 4—4 in FIG. 4.

Referring now to FIGS. 1–5, a hollow container shown generally at 10 has first and side walls 12 disposed between first and second parallel vertical end walls 14 and 16, the end walls being perpendicular to the side walls. The container also has a horizontal bottom section 18 secured to the bottom of the side and end walls and a horizontal top section 20 secured to the top of the side and end walls. End wall 16 has an opening 46.

The top section has an opening 22 extending from the first end wall to a position intermediate the first and second end walls and a flat portion 24 adjacent the opening 22. The top section also has a plurality of parallel equally spaced longitudinally extending grooves 26 extending between the second end wall and portion 24. The top section has a narrow flat portion 28 at the first end wall.

Suitable individual items of coding information or indicia can be disposed on portions 24 and 28 and associated with each of the grooves 26. This indicia can also be disposed as required on one or more cards 30 by writing same thereon and securing one or more vertical clips 32 to the top horizontal edge of the cards (which are rectangular) in such manner that an aperture 34 in each clip is coplanar with the card and disposed above the top. Horizontal rods 36 equal in number to the number of grooves 26 is sildably disposed in a corresponding groove. Each rod can be manually slid between an extended position at which it spans opening 22 and a retracted position at which it is withdrawn from this opening.

In use, the cards are disposed side by side within the container with the rods in extended position passing through the corresponding aligned apertures 34 in the clips 32.

The side walls 12 each have a horizontal slot 38. These slots are aligned at a level just below the bottom horizontal edge of the cards when the cards are held by the rods in the position for use. These slots extend from the rear of the container to the top section opening. A flat horizontal member 40 is slidably disposed in the slots and extends therebetween with ends 42 extending outside of the container. A user by grasping ends 42 can slide member 40 to a first position at which it is positioned below the cards and supports them or can slide member 40 to a second position at which it is withdrawn from the top section opening and provides no card support whatever.

A curved discharge chute 44 is disposed within the container. The chute has a raised portion 56 with an uppermost edge 48 secured to the inner surface of the first end wall and has a lowered portion 50 with a lowermost edge coincident with the second end wall opening 46.

In use, to select cards having desired indicia, the appropriate rods are slid manually to the retracted positions. Member 40 is then moved to its second position. The particular cards which are now not supported by rods are released, fall downward onto the chute and are guided thereby to the opening 46 from whence they can be removed.

Of course, the cards can be replaced, the rods moved back to extended position and member 40 moved back to its first position to return the device to its initial position for operation.

What is claimed is:

1. A manually operable device for selectively extracting at least one data carrying card from a collection of rectangular data carrying cards, said cards having top horizontal edges, said device comprising:

a hollow container having first and second parallel vertical side walls disposed between first and second parallel vertical end walls, the end walls being perpendicular to the side walls, said container having a horizontal bottom section secured to the bottom of said side and end walls and a horizontal top section secured to the top of said side and end walls, said top section having an opening extending from the first end wall to a position intermediate the first and second end walls and further having a plurality of parallel grooves in the top surface which extend from said opening toward the second end wall, said second end wall having an opening which extends from said bottom section to a point intermediate the top and bottom of said second end wall;

a like plurality of horizontal rods, each rod being slidably disposed in a corresponding one of said grooves, each rod being manually slidable between an extended position at which it spans the opening and a retracted position at which it is withdrawn from said opening; and a plurality of vertical clips, each clip being secured to the said card edge of a card with an aperture therein coplanar with said card and disposed above said card edge, said cards being disposed within said opening in side by side position with said apertures being disposed along a like first plurality of horizontal lines, each line being aligned with a corresponding one of said grooves, each rod when in extended position extending through all of the apertures in the corresponding line to support the cards having said apertures in raised position within the container, each rod when in retracted position releasing said support, all unsupported cards falling to the bottom section and being manually removable from said container through said second end wall opening.

2. The device of claim 1 wherein the container is provided with a discharge chute secured to the top surface of the bottom section, the chute having a raised portion with an uppermost edge secured to the inner surface of the first end wall and a lowered portion with a lowermost edge coincident with said second end wall opening.

3. The device of claim 2 wherein said side walls each have a horizontal slot, said slots being aligned and being disposed slightly below the lower horizontal edges of the cards when the cards are supported in raised position, said slots extending from the first end wall to a position beyond said top section opening.

4. The device of claim 3 wherein a horizontal member extends through said slots and between said side walls, said member being manually slidable between a first position at which it spans said top section opening and a second position at which it is fully withdrawn from said top section opening.

* * * * *